(12) United States Patent
Shu

(10) Patent No.: US 8,788,495 B2
(45) Date of Patent: Jul. 22, 2014

(54) ADDING AND PROCESSING TAGS WITH EMOTION DATA

(75) Inventor: Fang Rui Shu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 12/749,718

(22) Filed: Mar. 30, 2010

(65) Prior Publication Data

US 2010/0250554 A1  Sep. 30, 2010

(30) Foreign Application Priority Data

Mar. 31, 2009  (CN) .......................... 2009 1 0133413

(51) Int. Cl.
  *G06F 17/30*  (2006.01)
  *G06F 7/00*  (2006.01)
(52) U.S. Cl.
  USPC ............. 707/736; 707/748; 707/749; 706/46; 706/47; 706/48
(58) Field of Classification Search
  None
  See application file for complete search history.

(56) References Cited

U.S. PATENT DOCUMENTS

| 7,418,116 | B2* | 8/2008 | Fedorovskaya et al. ....... 382/118 |
| 2007/0201731 | A1* | 8/2007 | Fedorovskaya et al. ....... 382/118 |
| 2007/0282907 | A1* | 12/2007 | Chambers ................... 707/104.1 |
| 2008/0091515 | A1* | 4/2008 | Thieberger et al. ............. 705/10 |
| 2008/0222671 | A1* | 9/2008 | Lee et al. ........................ 725/10 |
| 2009/0094286 | A1* | 4/2009 | Lee et al. .................... 707/104.1 |
| 2009/0118594 | A1* | 5/2009 | Zdeblick ........................ 600/300 |
| 2009/0131764 | A1* | 5/2009 | Lee et al. ....................... 600/301 |
| 2009/0150919 | A1* | 6/2009 | Lee et al. ......................... 725/10 |

FOREIGN PATENT DOCUMENTS

| JP | 2001282847 | 10/2001 |
| JP | 2003178078 | 6/2003 |
| JP | 2003209523 | 7/2003 |
| JP | 2008269065 | 11/2008 |
| JP | 2010520552 | 6/2010 |

OTHER PUBLICATIONS

D. Derks et al., "Emoticons and Social Interaction on the Internet: The Importance of Social Context", Computers in Human Behavior, vol. 23, Issue 1, pp. 842-849, 2007.

* cited by examiner

*Primary Examiner* — Angelica Ruiz
(74) *Attorney, Agent, or Firm* — A. Bruce Clay

(57) ABSTRACT

Emotion data is added to tags. The emotion data is generated by a user upon accessing content. The emotion data is obtained from measurable physiological parameters that reflect the user's emotions while accessing the content. The emotion data can be used to provide services.

18 Claims, 6 Drawing Sheets

ADDING AND PROCESSING TAGS WITH EMOTION DATA

BACKGROUND

The present invention relates to the field of computers, and particularly to a method and apparatus for adding and processing tags with emotion data.

As Internet technologies constantly develop, users access various content such as pictures, text, video, audio and etc. Therefore, quickly and accurately searching and accessing desired content becomes more of an issue.

Searching content can be performed by automatic content analysis. However, automatic content analysis does not adequately generate sufficient content metadata because there is a semantic gap between low-level features and high-level concepts. Therefore, current technology is to add semantic tags for the content. By doing so, a user can generate tags proactively to describe the content in a more accurate way.

However, at present, all tags supported by various Web 2.0 services are only textual tags including keywords of text features, but such textual tags cannot always express special content sufficiently. For instance, a textual tag of a snow mountain picture includes the following keywords of text features: the Himalayas, travel, mountain, snow and so on, but this cannot express a user's emotions and cannot display the emotions of the user who sees the Himalayas for the first time.

BRIEF SUMMARY

According to a first aspect of the invention, a computer implemented method for adding tags with emotion data comprises receiving, at a computing device, emotion data generated by a user upon accessing content. The emotion data is obtained according to measurable physiological parameters reflecting the user's emotions. The emotion data content is added to the tags.

According to a second aspect of the present invention, there is provided a computer implemented method for processing tags with emotion data. Emotion data is extracted from a tag with a computing device. The tag corresponds to one content. The emotion data is obtained according to measureable physiological parameters reflecting the user's emotions, and the emotion data is used to provide services.

According to a third aspect of the present invention, there is provided an apparatus for adding tags with emotion data. A receiver receives emotion data generated by a user upon accessing the content. The emotion data is obtained according to measurable physiological parameters reflecting the user's emotions, and an adder adds the tags with emotion data to the content based upon the emotion data.

According to a fourth aspect of the present invention, there is provided a computer program product for processing a tag with emotion data. The computer program product comprises a computer readable storage medium having computer readable program code embodied therewith. The computer readable program code comprises computer readable program code configured to extract emotion data from the tag, wherein the tag corresponds to one content. The emotion data is obtained according to measurable physiological parameters reflecting user's emotions. Computer readable program code is configured to provide a service for using the emotion data to provide services.

DETAILED DESCRIPTION

Figure 1:
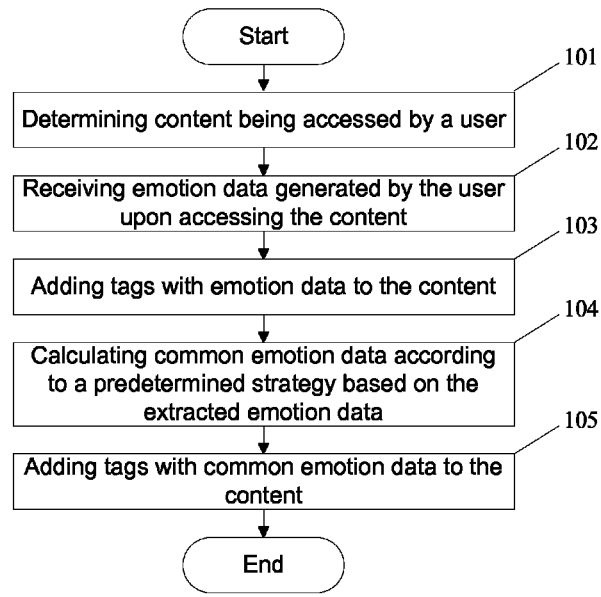
FIG. 1 is a flow chart showing a method of adding tags with emotion data according to one embodiment of the present invention.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Technical terms used in the present invention are first explained for the sake of clarity.

Emotion Data

When a user accesses certain content, he might generate an emotion corresponding to the content. Emotion data may be obtained according to one or more measurable physiological parameters reflecting the user's emotions.

Emotion data may include unprocessed physiological and action signals (e.g., heart rate, respiration rate, blood pressure, electroencephalogram parameters, body temperature, cutaneogalvanic reaction) which are also called physiological parameters. Different physiological parameters are associated with different emotion categories such as "like," "dislike," "afraid," and "happy." When a user accesses different content, for example, when viewing video of dangerous accidents or beautiful scenery images, or hear shrilling screams, he might generate different emotions so that the user's physiological parameters will be changed accordingly. Emotion data can further include values calculated by a certain feature extracting algorithm by using theses physiological parameters, wherein the feature extracting algorithm can, for example, calculate a difference for heart rates in two consecutive minutes, that is, a first derivative of heart rate.

A user's emotion data can be a vector for which elements thereof can be one or more of physiological parameters including heart rate, respiration rate, blood pressure, electroencephalogram parameters, body temperature, or cutaneogalvanic reaction. A plurality of user emotion data can constitute a matrix, with each row or column corresponding to a user's emotion data.

2. Common Emotion Data

Common emotion data may comprise comprehensive results obtained by calculating or carrying out statistics of respective emotion data generated when different users access the same content. Common emotion data can reflect "average" emotion generated when different users access the same content, and can be obtained by using emotion data according to a predetermined strategy.

3. Content

Content can be all or part of a picture, text, video or audio.

The present invention comprises adding and processing tags with emotion tags. FIG. 1 illustrates a method of adding tags with emotion tags, and FIG. 2 through FIG. 5 illustrates several examples of a method for processing tags with emotion tags.

In one embodiment of the present invention, reference emotion data is acquired. The reference emotion data can be emotion data for determining whether the acquired physiological parameters are normal or not. For example, whether the physiological parameters are within a normal range is judged by calculating a difference between a user's reference emotion data and the acquired user's physiological parameters, so as to determine whether the physiological parameters can serve as emotion data added to the tags.

When a range of values corresponding to each emotion is predetermined, the emotions corresponding to the emotion data can be determined by using the reference emotion data. For example, when a difference between the reference emotion data and one emotion datum falls within a predetermined range of values of the emotion "happy," the emotion corresponding to the emotion datum is "happy." When a difference between the reference emotion data and one emotion datum falls within a predetermined range of values of the emotion "afraid," the emotion corresponding to the emotion datum is "afraid." Therefore, a user's reference emotion data are used to determine a user's emotion when generating one emotion datum.

Specifically, in an embodiment, the user's reference emotion data can be received, and the reference emotion data can be determined based upon the user's physiological parameters in a calm state, wherein the reference emotion data can be generated by the user with respect to designated content upon registration, or an average of emotion data generated when the user accesses a series of ordinary content in different periods of time, or results obtained by using other more complicated algorithm methods.

Then, whether the user's current emotion data is within a normal range can be judged based upon the user's reference emotion data: if it is in a normal range, the emotion data can be added to tags; if it is not within a normal range, the emotion data will not be added to tags. For example, a difference between the currently acquired user's emotion data and the user's reference emotion data can be calculated, and then an average can be calculated from the difference, and then whether the average is within a normal range can be judged. Alternatively, a percentage of the difference relative to the reference value can be calculated, and then an average can be calculated from the percentage, and then whether the average is within a normal range can be judged. The normal range can be determined according to common medical knowledge, for example, a normal range of heart rate can be between zero and a maximum in medical science, and should not be negative or too high.

In addition, when a range of values corresponding to each emotion is preset, a judgment can also be made with respect to what emotion a user generating the currently received emotion data is presently in, based upon the user's reference emotion data.

It should be noted that the user's reference emotion data can be added to the tags and be processed as emotion data to provided services.

FIG. 1 is a flow chart showing a method of adding tags with emotion data according to one embodiment of the present invention. The emotion data generated by a user upon accessing content are received first, and then a tag with the emotion data is added to the content. Common emotion data corresponding to the content can be calculated according to the predetermined strategy by using the emotion data. The common emotion data can be considered as a kind of emotion data so that, like emotion data, the common emotion data is added to the content as a tag. Additionally, the common emotion data can be stored in memory to facilitate access thereof when the common emotion data is needed.

At step 101 content being accessed by a user is determined.

When the user wants to access certain content, he generally sends an access request to an apparatus or server of the present invention for adding tags with emotion data. If the apparatus judges that the user has access rights, the user is permitted to access the content. Therefore, various technologies in the state of art can be utilized to determine which user(s) are accessing what content.

If the user clicks a URL which is linked to a snow mountain picture, the apparatus of the present invention for adding tags with emotion data can determine that the user hopes to access the snow mountain picture. If the apparatus determines that the user has an access right, the user is allowed to browse this picture on his own display screen. Thus, the apparatus of the present invention for adding tags with emotion data can not only determine that the user is accessing the content but can also store a record that the user accessed this content.

Step 102 is a step of receiving emotion data generated by the user upon accessing the content.

In this step, physiological parameters generated by the user's access of content are sensed at a client (i.e., a user terminal), then the client obtains emotion data according to the sensed physiological parameters, and the obtained emotion data is provided to the apparatus of the present invention for adding tags with emotion data. Alternatively, physiological parameters generated by the user's access of content are sensed at a client (i.e., a user terminal). The client then directly provides the sensed physiological parameters to the apparatus of the present invention for adding tags with emotion data. Then the apparatus obtains emotion data according to the physiological parameters.

It should be noted that, before the step 102 is executed, a procedure for acquiring physiological parameters upon a user's access to content and obtaining emotion data generated upon the user's access to the content based on the physiological parameters can be executed. A physiological parameter sensor or biological signal detector can be arranged at the client. For example, it is placed near a user terminal or a sensor can be worn on a users' body so as to sense the physiological parameters generated upon the user's access to the content in step 102. In another embodiment, a difference between a pre-acquired user's reference emotion data and the sensed user's physiological parameters can be calculated. Then it is determined whether the physiological parameters are within a normal range. Physiological parameters within the normal range are considered to be emotion data.

In the present embodiment, the specific procedure of step 102 is as follows:

Assuming that three users are accessing a snow mountain picture, each of these three users wears a sensor that can sense physiological parameters such as the user's heart rate and blood pressure. The signals sensed can be converted into electrical signals at the client. The user's emotion data can be obtained by means of amplification of the electrical signals and analog to digital (A/D) conversion. Then the emotion data is provided to the apparatus in order to add tags with emotion data. In an alternative solution, the client can directly provide the signals sensed by the sensor to add tags with emotion data, and the apparatus can convert the sensed signals into electrical signals, amplify the electrical signals, and conducts A/D conversion to obtain the user's emotion data.

If the first user's emotion data obtained from the step 102 are (70, 110, 85), they indicate that the first user's heart rate is 70 beats/minute and blood pressure is 110/85 millimeter of mercury (mmHg), wherein the systolic pressure is 110 mmHg and the diastolic pressure is 85 mmHg. A second user's emotion data are (75, 120, 90), they indicate that the second user's heart rate is 75 beats/minute and blood pressure is 120/90 mmHg. A third user's emotion data are (80, 100, 70), they indicate that the third user's heart rate is 80 beats/minute and blood pressure is 100/70 mmHg.

In one example, emotion categories can be determined by a statistics pattern recognition according to the physiological parameters. Specifically, a pattern for each emotion is in accordance with a training sample of a statistics method. Then the trained pattern is used to classify the physiological parameters. Therefore, it can be determined which emotion category the use is in, for example, "happy," "astonishing," or "afraid" by using the trained pattern to classify the emotion data.

In another example, when a range of values corresponding to each emotion category is determined in advance, an emotion category corresponding to the physiological parameters can be determined by using the reference emotion parameters. For instance, when the difference between the reference emotion data and the physiological parameters is within a range of values of the emotion "happy," the emotion corresponding to the physiological parameters is determined to be "happy," i.e., the user is in the "happy" emotion when generating the physiological parameters.

In this embodiment, it is assumed that the first user's emotion is "happy," the second user's emotion "astonishing" and the third user's emotion "afraid."

Step 103 adds tags with emotion data to the content.

The apparatus of the present invention can use elements contained in the emotion data directly as tags. Alternatively, the apparatus can use additional information with the emotion data jointly as tags, wherein the additional information is, for example, the user's IP address, identifier and access timestamp.

Step 104 is a step of calculating common emotion data according to a predetermined strategy based on the extracted emotion data.

The apparatus can calculate common emotion data according to various predetermined strategies. For example, when the tag carries emotion data generated when multiple users access the content, the common emotion data can be calculated by averaging different users. A mean value of Gauss distribution from multiple user's emotion data can be calculated, and the average used as the common emotion data. Emotion data from multiple users are weighted by using predetermined weights, and a sum of the weighted emotion data is considered as the common emotion data. The common emotion data can be calculated by using other statistics pattern recognition. Analogous to emotion data, the common emotion data obtained by calculation can be a vector.

In this embodiment, for example the average (75, 110, 82) of emotion data of multiple users can be regarded as the common emotion data.

In step 105, the apparatus for adding tags with emotion data adds tags with common emotion data to the content to provide services for the user by processing the common emotion data.

In other embodiments, the common emotion data can be stored in memory or any accessible medium, such as a magnetic disk, floppy disk, compact disc (CD), magnetic tape and other media.

Subsequent to step 105, the procedure ends.

It should be appreciated that steps 104 and 105 may be optional. In the absence of steps 104 and 105, the common emotion data can be calculated in subsequent processing of the tags with emotion data. In the presence of steps 104 and 105, the common emotion data are directly extracted from the tags or read from the memory upon processing the tags with emotion data.

In an embodiment of the present invention, emotion data obtained from a user viewing a video can be obtained by acquiring the user's physiological parameters at different points in time. Then, the emotion data obtained can be a set of multiple emotion data. Each emotion datum in the set corresponds to the user's emotion at each time point, wherein a time interval between time points can be preset, for example, the time intervals can be one minute. The emotion data generated by the user when accessing the content can be each emotion datum in the emotion data set and a time point corresponding to each emotion datum. In the step of adding tags with emotion data to the content, each emotion datum and the time point corresponding to the each emotion datum received can both be included in the tags, and then such tags can be added to the content. Thus, when such tags are processed subsequently, the user's emotion data at different points of time can be extracted to more conveniently and efficiently conduct corresponding processing.

FIG. 2 through FIG. 5, respectively, illustrate examples of a method of processing tags with emotion data. The examples can be fulfilled by an apparatus of the present invention for processing tags with emotion data. Tags with emotion data to be processed are obtained by receiving the emotion data generated upon the user's access to the content and adding the received emotion data to the contents as a tag. In addition, tags with emotion data to be processed can be obtained by other technologies publicly known to those skilled in the art.

Figure 2:
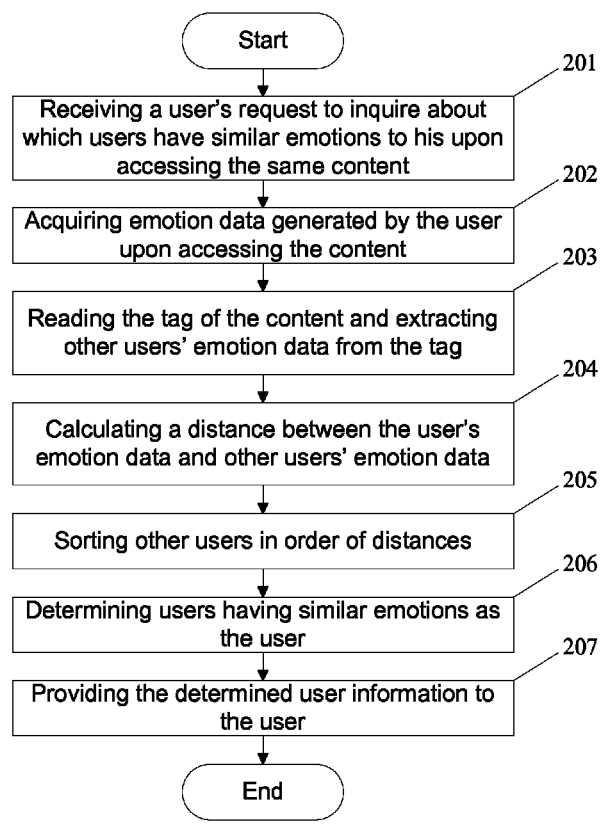
FIG. 2 is a flow chart showing a method of processing tags with emotion data according to one embodiment of the present invention.

In the example, as shown in FIG. 2, the apparatus for processing tags with emotion data first responds to one user's query for other users generating similar emotions of the one user upon accessing the content. The emotion data generated by the one user accessing the content is acquired. Other users' emotion data is extracted from the tags of the content. Other users whose emotions are similar to the one user are determined according to the one user's emotion data and other users' emotion data. Other users' information is then provided to the one user.

Figure 3:
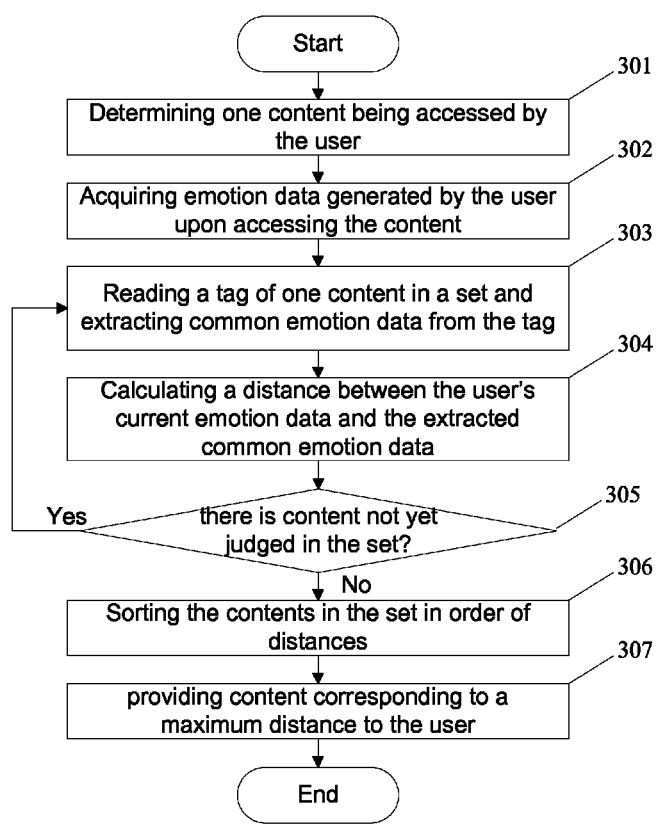
FIG. 3 is a flow chart showing a method of processing tags with emotion data according to another embodiment of the present invention.

In the example shown in FIG. 3, the apparatus for processing tags with emotion data first acquires emotion data generated by a user with respect to the currently accessed content. Emotion data is extracted from the tag of content to be matched. Then matching content is searched according to the user's current emotion data. The emotion data is then extracted from the tag of the content to be matched, wherein the tag of the matching content has emotion data matching the user's current emotion data. The matching content is then provided to the user.

Figure 4:
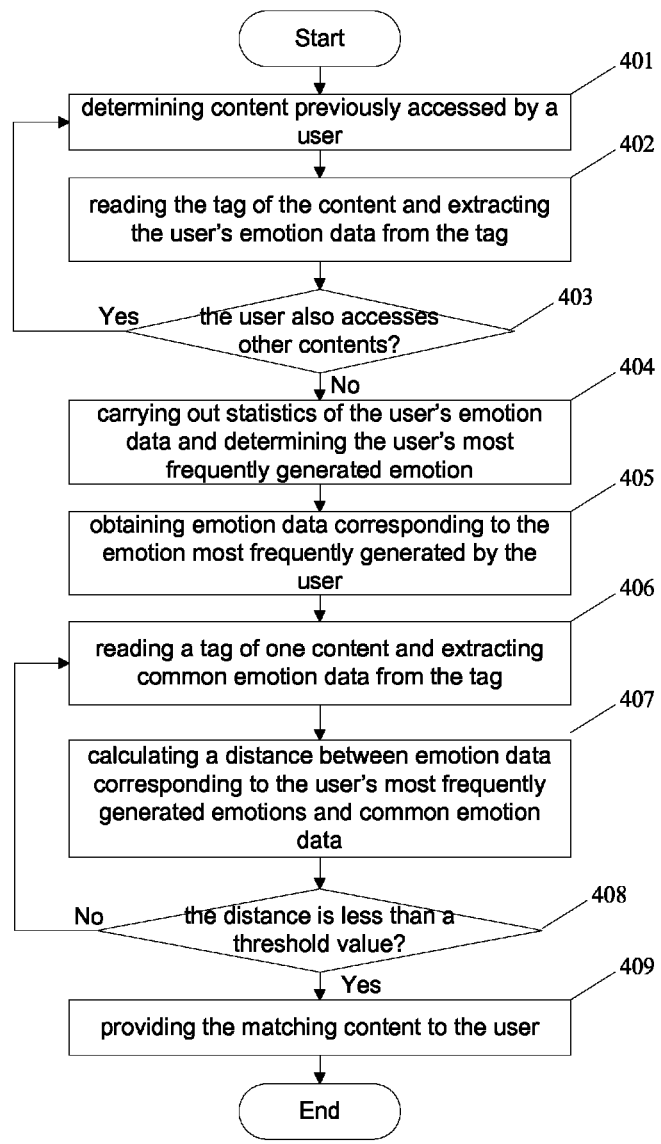
FIG. 4 is a flow chart showing a method of processing tags with emotion data according to a further embodiment of the present invention.

In the example as shown in FIG. 4, the apparatus for processing tags with emotion data first extracts emotion data from tags of content previously accessed by one user. Emotion data is extracted from the tag of content to be matched. Emotions most frequently generated by the one user are determined by carrying out statistics of emotion data extracted from the tags of content previously accessed by the one user. Matching content is searched according to emotion data corresponding to the emotions most frequently generated by the one user and the emotion data extracted from the tag of content to be matched. The matching content is then provided to the one user.

In the example in F*ig*.5, the apparatus for processing tags with emotion data first receives one user's request for emotions of other users who accessed the same content. Other users' emotion data is extracted from the tag of the same content in response to the request, and thereafter actuates the one user based on the extracted other users' emotion data.

The embodiment as shown in FIG. 2 through FIG. 5 is described in more detail as follows.

FIG. 2 is a flow chart showing a method of processing tags with emotion data according to an embodiment of the present invention. A scenario is assumed in which User 1 is browsing a snow mountain picture. After viewing the beautiful landscape of the snow mountain, User 1 expects to travel to the snow mountain and expects to find a person with the same interests as a companion. Therefore, User 1 might hope to inquire about users who have similar emotions upon accessing this picture, and thereby further communicate with them.

In step 201, a user's request inquiring about which users have similar emotions to his upon accessing the same content is received.

Step 202 relates to acquiring emotion data generated by the user upon accessing the content.

Similar to step 102 in the embodiment as shown in FIG. 1, in step 202 the apparatus first senses physiological parameters generated by the user upon accessing the content. The user's emotion data is then obtained by using the sensed physiological parameters.

In the present embodiment, it is assumed that the emotion of user 1 from viewing the snow mountain is "astonishing" and user 1's emotion data obtained by sensing is (75, 120, 90), wherein elements therein respectively correspond to physiological parameters such as the user's heart rate, systolic blood pressure and diastolic blood pressure.

Step 203 reads the tag of the content and extracts other users' emotion data from the tag.

In this embodiment, it is assumed that three users (user 2, user 3, and user 4) accessed the snow mountain picture. User 2's emotion data is (70, 110, 85), user 3's emotion data is (75, 120, 90) and user 4's emotion data is (80, 100, 70). All this emotion data is already stored in a tag of the picture. The apparatus can respectively extract the emotion data of the three users from the tag.

Step 204 calculates a distance between the user's emotion data and that of other users.

The distance between emotion data can be calculated by, for example, Euclidean distance or other methods known by those skilled in the art.

Provided that an n-dimensional vector is used to express emotion data in the following equation $X_{j \times n} = <x_{j1}, x_{j2}, \ldots, x_{jn}>$, wherein n represents the number of the sensed physiological parameters, and j represents the $j^{th}$ user, the distance between the $i^{th}$ user and the $j^{th}$ user, namely, the distance between vectors $X_i$ and $X_j$ is:

$$d_{ij} = \sqrt{\sum_{k=1}^{n} (X_{ik} - X_{jk})^2}.$$

This can be used as the distance between emotion data of $i^{th}$ user and the $j^{th}$ user.

In this embodiment, the apparatus of the present invention for processing tags with emotion data can calculate the distance between emotion data (75, 120, 90) of User 1 and emotion data (70, 110, 85), (75, 120, 90), (80, 100, 70) of User 2, User 3 and User 4 by the above algorithm method. It is assumed that the calculated distance is $d_{12}=12.25$, $d_{13}=0$ and $d_{14}=28.73$.

Step 205 sorts other users in order of distance.

The calculated distances can be sorted in an ascending or descending order so as to sort other users accordingly. In this embodiment, since $d_{13}<d_{12}<d_{14}$, the three other users are arranged in an ascending order of distances as: User 3, User 2 and User 4.

Step 206 determines users with similar emotions as the user.

The distance between emotion data expresses a degree of similarity between users' emotions. The less the distance, the higher the degree of similarity. The larger the distance, the lower the degree of similarity. In this embodiment, the distance between emotion data of User 3 and User 1 is a minimum, so it is determined that the user having the most similar emotions as User 1 is User 3.

Step 204 through Step 206 show a specific implementation determining what other users have similar emotions to the user according to the user's emotion data and other users' emotion data. It is appreciated that the procedure can be implemented by using other means known in the art.

Step 207 provides the user information to the user.

Information such as a user's IP address, identifier and access timestamp can be stored in memory, or any other storage medium that the apparatus of the present invention can access. In this embodiment, the apparatus can provide user information from User 3 so that User 1 can send chat information or E-mail to User 3 for activities such as friend making.

Then the procedure comes to an end.

FIG. 3 is a flow chart showing a method of processing tags with emotion data according to another embodiment of the present invention. In the example as shown in FIG. 3, the apparatus acquires one user's current emotion data, searches for content of emotion data in the tags matching the user's current emotion data, and provides the desired content to the user.

In this embodiment, User 1 is browsing a snow mountain picture. In this instance, the user is psychologically afraid of the snow mountain because of past outdoor experience. Thus, the user generates the emotion "afraid" upon viewing the snow picture. Content contrary to the user's current emotions can be provided to the user so as to try to improve the user's experience.

Step 301 determines content being accessed by the user.

Step 301 is analogous to Step 101 of FIG. 1. When a user hopes to access certain content, he usually sends an access request. If the user is determined to have access rights, the content can be accessed. Therefore, it can be determined which user, or users, are accessing what content.

In Step 301, it is determined that content being accessed by a user (e.g., User 1) is, for example, a snow mountain picture.

Step 302 acquires emotion data generated by the user upon accessing the content.

Similar to Step 102 in the embodiment in FIG. 1, physiological parameters generated by the user upon accessing the content is first sensed at step 302, and then the user's emotion data is obtained by using the physiological parameters sensed.

In this embodiment, it is presumed that the emotion of User 1 upon viewing the snow mountain picture is "afraid." User 1's emotion data obtained by sensing is (80, 100, 70), wherein the elements correspond to physiological parameters such as the user's heart rate, systolic blood pressure and diastolic blood pressure.

Step 303 reads a tag of one content in a set and extracts common emotion data from the tag. In this embodiment, images, videos, words, voice, and so on constitute a set C, wherein $i^{th}$ it is presumed that the set C contains n number of content, and the $i^{th}$ content of the set C is $C_i$.

In this embodiment, from Step 303 to Step 305, emotion data tags of each content in the set C is compared with User 1's emotion data to determine the distance therebetween. Such judgment is conducted N times until all the content in set C are judged.

According to the embodiment of FIG. 1, common emotion data is pre-calculated, added to the content as a tag or stored in memory during addition of tags with emotion data. Alternatively, common emotion data is calculated in real time, added to the content as a tag, or stored in memory during the processing of tags.

In this embodiment, it is presumed that the common emotion data is pre-calculated and added to the content as a tag or stored in memory during addition of tags with emotion data. Therefore, in Step 303, a tag of each content in the set c is read, and the common emotion data is extracted from the tag. It is presumed that the common emotion data extracted from the first content $C_1$ of the set C are (75, 110, 82).

In another embodiment, in Step 303 a tag of one content of the set is read and emotion data is extracted from the tag. The common emotion data corresponding to the first content $C_1$ in the set C is obtained by using the extracted emotion data according to a predetermined strategy.

Step 304 calculates a distance between the user's current emotion data and the extracted common emotion data. In this step, a distance $d_1$ is calculated between User 1's current emotion data (75, 120, 90) and the common emotion data (75, 110, 82) extracted from the tag of the content $C_i$, wherein i denotes the $i^{th}$ content in the set C.

The distance can be calculated, for example, by using Euclidean distance or by other methods known by those skilled in the art.

The Steps 303-304 as described above are merely a specific example of the present invention. In another embodiment, in Step 303, emotion data can be arbitrarily extracted from the tag of the content, not necessarily limited to common emotion data. Step 304 calculates a distance between the user's current emotion data and the emotion data arbitrarily extracted from the tag of the content.

Step 305 determines whether there is content not yet judged in the set. First of all, a determination is made of which content is for calculating the current distance. If the content is the $N^{th}$ content, i.e., i=N, the procedure will come to Step 306; otherwise, return to Step 303 to continue to calculate a distance between the emotion data in tags of other content in the set C and User 1's emotion data.

Step 306 sorts the content in the set in order of distance. According to Step 303 to Step 305, N distances between the emotion data in the set C and User 1's emotion data are calculated, i.e., $d_1, d_2, \ldots, d_N$. The calculated distances can be sorted in an ascending or descending order, and the content in the set can be sorted accordingly.

Step 307 provides content corresponding to a maximum distance to the user.

The maximum distance is presumed to be $d_2$, and the content that the maximum distance $d_2$ corresponds to is $C_2$. The content $C_2$ is, for example, a part of a joyful wedding ceremony, which leads to a "joyful" user's psychological response. As such, User 1 can be transformed from an "afraid" emotion to a "joyful" emotion, thereby adjusting the user's mood and improving the user's experience.

Then the procedure comes to an end.

Preferably, the embodiment as shown in FIG. 3 is applied to a situation in which the user is currently in a negative emotion such as "afraid" and/or "dislike," so as to stabilize the user's mood in time and improve the user's experience.

In another embodiment, in Step 307, content corresponding to a minimum distance can be provided for User 1. At this time, what is provided for User 1 may be a movie about a disaster or other similar content so that the user continues to experience the emotion "afraid." A client can define in real time or fixedly pre-set providing content corresponding to what distance for the user.

The emotion data in the tag corresponding to a maximum distance and in the tag corresponding to a minimum distance, both can be used as emotion data matching the user's current emotion data. Therefore, in one embodiment, content corresponding to the maximum distance can be the matching content, whereas in another embodiment content corresponding to the minimum distance can be the matching content.

FIG. 4 is a flow chart showing a method of processing tags with emotion data according to a further embodiment of the present invention. In this embodiment, User 1 accesses four content items including a picture showing beautiful scenery of a snow mountain, a Chaplin's video clip, a blog about a beach vacation and a video clip of a thriller movie. By using the method of the present invention, the apparatus can provide matching content for the user according to a record of user 1's accesses. The emotion data of the matching content corresponds to User 1's most frequently generated emotions.

Step 401 determines content previously accessed by a user.

The user might have previously accessed a variety of content, for example, pictures, video clips, songs, or blogs through the Internet. When the user accesses these types of content, relevant information, such as the user's IP address, URL of the accessed content, timestamp and duration can be recorded in a weblog. Content previously accessed by the user can be determined by reading the recorded information. In addition, content previously accessed can be determined by using other technologies known to those skilled in the art.

Preferably, in Step 401a time interval can be preset, and content accessed by the user in the time interval can be determined. For example, only content accessed by the user in the recent hour is determined. In this way, the user's recent emotion situations can be more accurately understood to provide content more suitable for the user's recent emotions. The preset time interval can be several minutes, several hours, several days, several weeks and the like, and can be set by the user or fixed as designed in a system.

Step 402 reads the tag of the content and extracts the user's emotion data from the tag. The apparatus of the present invention can add emotion data generated by the user upon accessing the above content and other additional information (e.g., the user's IP address, identifier and access timestamp) as tags, respectively, to a picture showing beautiful scenery of a snow mountain, a Chaplin's video clip, a blog about a beach vacation, and a video clip of a thriller movie.

As such, the tags of this content can be read to find and extract the user's emotion data.

In this embodiment, it is presumed that emotion data generated by the user upon browsing the snow mountain picture is (70, 112, 85), emotion data generated upon viewing Chaplin's video clips is (72, 111, 82), emotion data generated upon reading a blog about a beach vacation is (75, 110, 80), and emotion data generated upon viewing a thriller movie video clip is (95, 120, 90). All this emotion data is already included in the tags of corresponding content. When Step 402 is executed, the user's emotion data can be extracted from a tag of content.

Step 403 judges whether the user also accesses other content. Judgment is made whether content from emotion data tags already extracted reaches a total number of content previously accessed by the user (four in the present embodiment). If so, the procedure will go to Step 404; if not, the procedure will go back to Step 401 for further processing.

Step 404 carries out statistics of the user's emotion data and determines the user's most frequently generated emotion. The user's most frequently generated emotion can be determined by a clustering method of statistics pattern recognition. For example, the procedure can be accomplished by using a k-mean clustering method. It can be concluded from an analysis of four emotion data extracted from Steps 401-403 that emotion data (70, 112, 85), (72, 111, 82), and (75, 110, 80) in the tags of the first three content items (i.e., snow mountain picture, Chaplin's video clip, and a blog about beach vacation) are closer to one another, and the emotion data (95, 120, 90) in the tag of the fourth content (a thriller movie video clip) is by far different from the emotion data in the tags of the first three contents. As such, the first three content items can be classified as a first type, and the fourth content can be classified as a second type. Since the number of content items contained in the first type is larger than the number of content items contained in the second type, it can be determined that the emotion generated by the user upon accessing the contents (i.e., the first three content items) contained in the first type is the most frequently generated emotion of the user.

Step 405 obtains emotion data corresponding to the emotion most frequently generated by the user.

The user's emotion data in the tag of any one of contents in the first type can be regarded as emotion data corresponding to the emotion most frequently generated by the user. An average, a mean value of Gauss distribution or a weighted value of the user's emotion data in tags of all content of the first type are calculated, and the calculation results are regarded as emotion data most frequently generated by the user.

Step 406 reads a tag of one content and extracts common emotion data from the tag. In this embodiment, from Steps 406 to 408, content that might cause the user to generate his most frequently generated emotions is provided by determining a distance between emotion data obtained from Step 405 corresponding to the user's most frequently generated emotions and common emotion data in a tag of a certain content, so as to improve the user's experience.

Step 407 calculates a distance between the user's most frequently generated emotions and common emotion data. The distance can be calculated, for example, with Euclidean distance or other methods known by those skilled in the art.

The Steps 406-407, as described above, are merely a specific example of the present invention. In another embodiment, in Step 406, one emotion datum can be arbitrarily extracted from the tag of the content, not necessarily limited to common emotion data. Then Step 407 calculates a distance between emotion data corresponding to the user's most frequently generated emotions and one emotion datum arbitrarily extracted from the tag of the content.

Step 408 determines whether the calculated distance is less than a threshold value. The threshold value can be fixed by the system, or set by the user, and adjusted by the user on his own, according to actual situations.

If the distance calculated in Step 407 is less than the threshold value, the average emotion data being judged is much closer to the emotion data corresponding to the user's most frequently generated emotion. If it is determined that matching content is found, the procedure will go to Step 409. Otherwise, the procedure will return to Step 406 to continue searching for matching content.

In other embodiments, there may be no matching content after all content is judged. At this time, each content can be re-judged by properly raising the threshold value, which can be done by the system or by the user.

Step 409 provides the matching content for the user. The matching content is content, with the distance between emotion data in the tag and emotion data corresponding to the emotion most frequently generated by the user, is less than the threshold value. Content that might cause the user to generate his most frequently generated emotion is provided so the user's experience can be quickly and timely improved.

In this embodiment, the emotion most frequently generated by the user is judged to be "happy." Content possibly causing the "happy" emotion can be provided for the user, for example, a crosstalk audio clip, a comedy movie, or a cartoon can be provided to the user.

In another embodiment, content causing an emotion opposite to the emotion "happy" can be regarded as matching content. For example, content that might cause the emotion "sad" can be regarded as matching content. At this time, it can be determined in Step 408 whether the calculated distance is greater than the predetermined threshold, and then content corresponding to the distance greater than the predetermined threshold can be regarded as matching content.

Then the procedure comes to an end.

Figure 5:
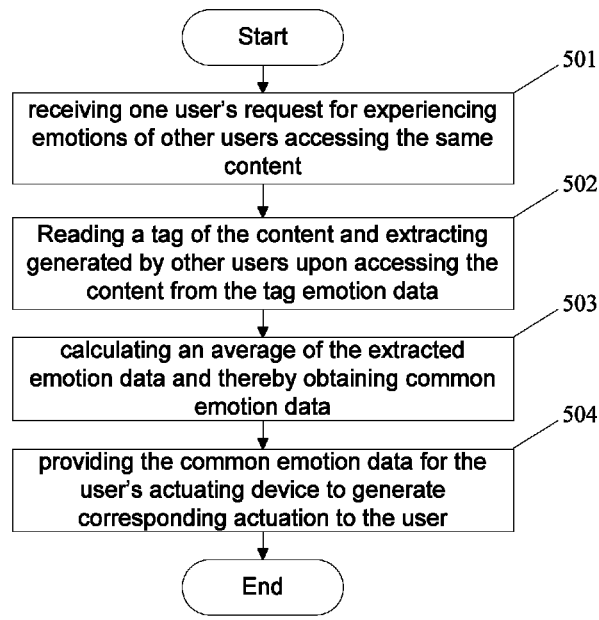
FIG. 5 is a flow chart showing a method of processing tags with emotion data according to a further another embodiment of the present invention.

FIG. 5 is a flow chart showing a method of processing tags with emotion data according to a further embodiment of the present invention. In this embodiment, a scenario is presumed in which User 1 is accessing a snow mountain picture and hopes to experience emotions generated by other users who have accessed this picture. By the method of the present invention, the apparatus can enable User 1 to experience emotions generated by other users accessing the same content, thereby improving the user's experience.

Step 501 receives one user's request for experiencing emotions of other users accessing the same content.

Step 502 reads a tag of the content and extracts emotion data generated by other users upon accessing the content.

Similar to Step 203 in the embodiment as shown in FIG. 2, it is presumed that three users (user 2, user 3, and user 4) have accessed the same snow mountain picture. User 2's emotion data is (70, 110, 85), user 3's emotion data is (75, 120, 90), and user 4's emotion data is (80, 100, 70). All of this emotion data has already been stored in a tag of the picture. Step 502 reads the tag of the snow mountain picture and, respectively, extracts the emotion data of User 2, User 3 and User 4.

Step 503 calculates an average of the extracted emotion data and thereby obtains common emotion data.

It is known from the embodiment as shown in FIG. 1 that the common emotion data can be pre-calculated, added to the content as a tag, or stored in memory during addition of tags with emotion data. Alternatively, common emotion data can be calculated in real time, added to the content as a tag or stored in a memory during the processing of emotion tags.

In this embodiment, it is assumed that the common emotion data is not pre-calculated during addition of tags with emotion data. Therefore, in Step 503, the common emotion data is calculated according to the emotion data of User 2, User 3 and User 4 extracted in Step 502.

The common emotion data can be calculated according to various predetermined strategies. For example, when the tag carries emotion data generated when multiple users access the content, the common emotion data can be calculated by averaging. Alternatively, a mean value of Gauss distribution from multiple user's emotion data can be calculated, and the average is used as the common emotion data. Emotion data from the multiple users can also be weighted by using predetermined weights, and a sum of the weighted emotion data is considered as the common emotion data.

In this embodiment, emotion data of User 2, User 3 and User 4 are weighted by using predetermined weights, preset, for example, according to levels, importance, or priority of the users. For example, User 2 is a junior user with less weighting (0.2), User 3 is a senior user with a larger weighting (0.5), and User 4 is a mezzanine user with a moderate weighting (0.3). Emotion data (70, 110, 85), (75, 120, 90) and (80, 100, 70) of User 2, User 3 and User 4 are respectively weighted by using the above weightings, and the weighted emotion data are added up to obtain the common emotion data (75.5, 112, 83).

Step 504 provides the common emotion data for the user's actuating device to generate corresponding actuation to the user. In this embodiment, the client can be provided an example actuating device to convert the common emotion data into actuation for the user, whereby the user experiences emotions corresponding to the common emotion data of other users.

The user can be actuated in various manners, for example, converting the common emotion data into audio frequency signals which are then played by a notebook computer, a mobile phone, or a PDA so that the user experiences the common emotion data by listening to the music. Alternatively, emotion data can be converted into optical signals by providing common emotion data to a lighting control system to enable the user to experience the common emotion data through changes of lighting around the user, or converting the common emotion data into weak current signals by providing a weak current stimulus in a mouse, thereby enabling the user to experience the common emotion data through weak current signal stimulus sent by the mouse when the user's hand grips the mouse.

Then the procedure comes to an end.

As shown in FIG. 5, any user's emotion data in the tag of the content can be used to actuate the user. That is to say, the user can be actuated based upon the emotion data extracted from the tag of the same content, and it is not necessary that the common emotion data be used.

Figure 6:
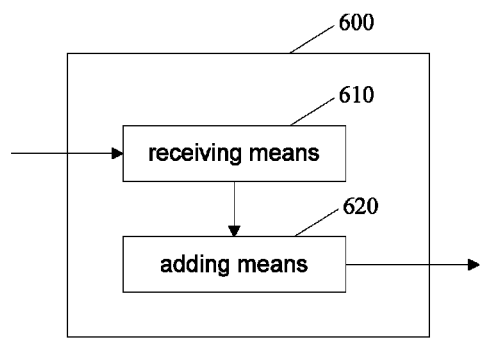
FIG. 6 is a block diagram of an apparatus for adding tags with emotion data according to one embodiment of the present invention.

FIG. 6 is a block diagram of an apparatus for adding tags with emotion data according to an embodiment of the present invention. An apparatus 600 can comprise a receiver 610 for receiving emotion data generated by a user upon accessing the content. The emotion data is obtained from measurable physiological parameters reflecting the user's emotions. Then, an adder 620 adds the tags with emotion data to the content based upon the emotion data.

A physiological parameter sensor or biological signal detector can be arranged at the client (i.e., a user terminal), for example, the sensor may be placed near a user terminal or worn by a user.

In this way, physiological parameters generated by the user upon accessing the content are sensed at a client (i.e., a user terminal), then the client obtains emotion data according to the sensed physiological parameters, and the emotion data is provided to the receiver 610. Alternatively, physiological parameters generated by the user when accessing the content are sensed at the client (i.e., a user terminal). Then the client directly provides the sensed physiological parameters to the receiver 610. Then the receiver 610 obtains emotion data according to the physiological parameters. Subsequently, the adder 620 adds the emotion data obtained by the receiver 610 to the content as a tag.

The apparatus 600 further comprises a calculator for determining common emotion data according to a predetermined strategy by using the emotion data. An adder adds the tag with the common emotion data to the content or stores the common emotion data in a memory to provide services to the user by processing the common emotion data. Common emotion data can be directly extracted from the tag or read from memory when the tag is subsequently processed.

The predetermined strategy can be any one of the following strategies: averaging emotion data from multiple users and using the average as the common emotion data; calculating a mean value of Gauss distribution of emotion data from multiple users, and regarding the mean value as the common emotion data; or weighting emotion data from the multiple users by using predetermined weights, and regarding a sum of the weighted emotion data as the common emotion data.

Figure 7:
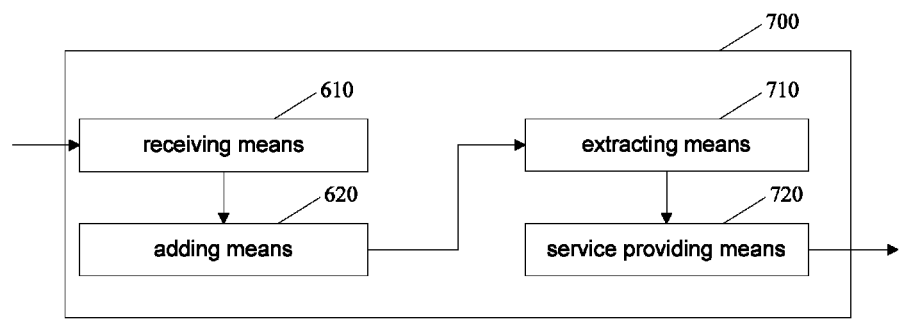
FIG. 7 is a block diagram of an apparatus for processing tags with emotion data according to one embodiment of the present invention.

FIG. 7 is a block diagram of an apparatus for processing tags with emotion data according to an embodiment of the present invention.

An apparatus 700 can comprise an extractor 710 for extracting emotion data from the tag with emotion data, wherein the tag corresponds to one content; a service provider 720 for providing services by using emotion data. The apparatus 700 can further comprise a receiver 610 for receiving emotion data generated by a user upon accessing the content, and an adder 620 for adding the tags with emotion data to the content based upon the emotion data.

The service provider 720 can comprise a calculator for calculating common emotion data corresponding to the content according to a predetermined strategy by using the emotion data, adder for adding the tag with common emotion data to the content, or storing the common emotion data in a memory, and a processor for processing the common emotion data as emotion data.

The predetermined strategy can be any one of the following strategies: averaging emotion data from multiple users and using the average as the common emotion data; calculating a mean value of Gauss distribution of emotion data from multiple users, and regarding the mean value as the common emotion data; or weighting emotion data from the multiple users by using predetermined weights, and regarding a sum of the weighted emotion data as the common emotion data.

In this embodiment, an extractor 710 can comprise a receiver for receiving one user's query request for other users generating similar emotions upon accessing the content; an acquirer for acquiring emotion data generated by one user upon accessing the content; and an extractor for extracting other users' emotion data from the tag of the content. The service provider 720 can comprise, according to one user's emotion data and other users' emotion data, a determiner for determining other users with similar emotions to the one user, and a provider for providing the determined other users' information to the one user.

In another embodiment, the extractor 710 extracts emotion data from the tag of the content to be matched. The service provider 720 can comprise an acquirer for acquiring emotion data generated by the user for the currently accessed content; a searcher searching matching content according to the user's current emotion data and the emotion data extracted from the tag of the content to be matched; and a provider for providing the matching content to the user.

In a another embodiment, the extractor 710 of the apparatus 700 extracts emotion data from tags of content previously accessed by one user. The emotion data is extracted from the tag of content to be matched. The service provider 720 can comprise a determiner for determining emotions most frequently generated by one user by carrying out statistics of emotion data extracted from the tags of content previously accessed by the one user. Matching content is searched for emotion data corresponding to the emotions most frequently generated by the one user and the emotion data extracted from the tag of content to be matched; and a provider for providing the matching content to the one user.

In a further embodiment, the extractor 710 can comprise a receiver for receiving one user's request for experiencing emotions of other users accessing the same content as the one user. An extractor extracts from the tag of the same content emotion data generated by other users upon accessing the same content. The service provider 720 can comprise an actuator for actuating the user based on the extracted other users' emotion data.

The present invention further provides a system for processing tags with emotion data. The system can comprise a client for sensing and providing emotion data generated by the user upon accessing the content. The emotion data is obtained according to measurable physiological parameters reflecting the user's emotions. A server processes tags with emotion data. The server can comprise a receiver for receiving emotion data generated by a user upon accessing the content. An adder adds the tags with emotion data to the content based upon the emotion data. An extractor extracts emotion data from the tag with emotion data. The service provider provides services by using emotion data.

Figure 8:
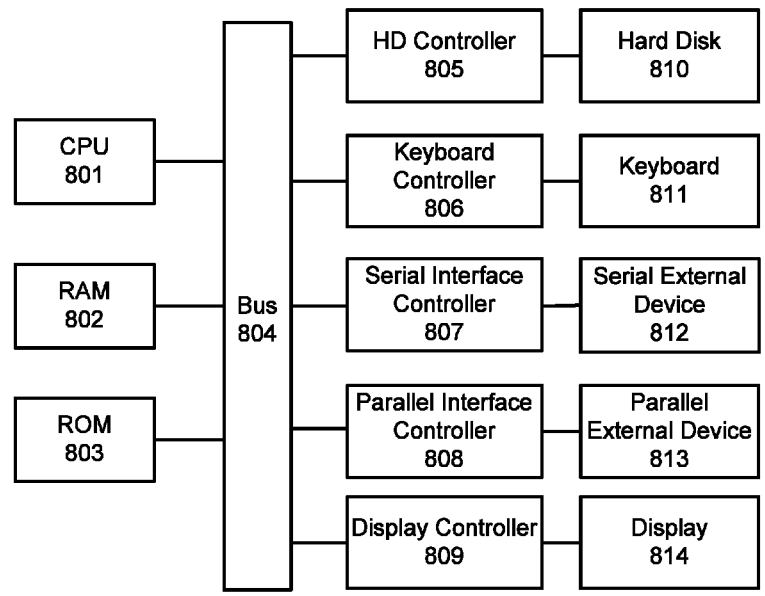
FIG. 8 is a structural block diagram of a computer system adapted to implement the present invention.

FIG. 8 is a structural block diagram of a computing apparatus for carrying out the embodiment of the present invention. A computer system comprises a CPU (central processing unit) 801, RAM (random access memory) 802, ROM (read only memory) 803, a system bus 804, a hard disk controller 805, a keyboard controller 806, a serial interface controller 807, a parallel interface controller 808, a display controller 809, a hard disk 810, a keyboard 811, a serial external device 812, a parallel external device 813 and a display 814. Among these components, the CPU 801, the RAM 802, the ROM 803, the hard disk controller 805, the keyboard controller 806, the serial interface controller 807, the parallel interface controller 808 and the display controller 809 are connected to the system bus 804; the hard disk 810 is connected to the hard disk controller 805; the keyboard 811 is connected to the keyboard controller 806; the serial external device 812 is connected to the serial interface controller 807; the parallel external device 813 is connected to the serial interface controller 808; and the display 814 is connected to the display controller 809.

The function of each component in FIG. 8 is publicly known in this technical field, and the structure as shown in FIG. 8 is conventional. In different applications, some components can be added to the structure shown in FIG. 8, or some components shown in FIG. 8 can be omitted. The whole system shown in FIG. 8 is controlled by computer readable instructions usually stored in the hard disk 810 as software, or stored in EPROM or other nonvolatile memories. The software can be downloaded from the network (not shown in the figure). The software stored in the hard disk 810 or downloaded from the network can be uploaded to RAM 802 and executed by the CPU 801 to perform functions determined by the software.

Although the computer system as described in FIG. 8 can support the apparatus for adding tags with emotion data and the apparatus for processing tags with emotion data according to the present invention, it is merely one example of a computer system. It is appreciated by those skilled in the art that many other computer system designs can also realize the embodiment of the present invention.

Therefore, the above embodiments are selected and described to better illustrate principles of the present invention and actual applications thereof, and to enable those having ordinary skill in the art to understand that without departure from the essence of the present invention, all the modifications and variations fall within the scope of protection of the present invention as defined by the appended claims.

What is claimed is:

1. A method of providing electronic data content with emotion data added to the electronic data content as tags, comprising:
   receiving, with a processor, a first user's emotion data generated by a first user upon accessing a first electronic data content, wherein said first user's emotion data is generated according to measurable physiological parameters reflecting said first user's emotions generated during said access by said first user;
   adding said first user's emotion data to said first electronic data content as at least a first tag;
   searching at least a second electronic data content, unrelated to said first electronic data content, to find at least a second tag reflecting a second user's emotion data generated by a second user upon accessing said at least a second electronic data content, wherein said second user's emotion data is generated according to measurable physiological parameters reflecting said second user's emotions generated during access by said second user to said at least a second electronic data content and added to said at least a second electronic data content as said at least a second tag;
   in response to finding said at least a second tag, determining whether said first user's emotion data, generated by said first user is similar, based upon a predetermined strategy, to said second user's emotion data; and
   in response to a determination that said first user's emotion data is similar to said second user's emotion data, providing said at least a second electronic data content to said first user.

2. The method of claim 1, further comprising providing, to said first user, information related to said second user.

3. The method of claim 1, further comprising:
   determining whether said first user's emotion data, generated by said first user, is dissimilar, based upon said predetermined strategy, to said second user's emotion data; and
   in response to a determination that said first user's emotion data is dissimilar to said second user's emotion data, providing said at least a second electronic data content to said first user.

4. The method of claim 3, further comprising providing, to said first user, information related to said second user.

5. The method of claim 1, wherein said first user's emotion data is stored to determine a most frequent emotion of said first user.

6. The method of claim 5, wherein said most frequent emotion is used to locate and present to said first user other electronic data content that will cause said first user to have said most frequent emotion.

7. A system for providing electronic data content with emotion data added to the electronic data content as tags, comprising:
   a processor; and
   memory connected to the processor, wherein the memory is encoded with instructions and wherein the instructions when executed comprise:
       instructions for receiving, with a processor, a first user's emotion data generated by a first user upon accessing a first electronic data content, wherein said first user's emotion data is generated according to measurable physiological parameters reflecting said first user's emotions generated during said access by said first user;

instructions for adding said first user's emotion data to said first electronic data content as at least a first tag;

instructions for searching at least a second electronic data content, unrelated to said first electronic data content, to find at least a second tag reflecting a second user's emotion data generated by a second user upon accessing said at least a second electronic data content, wherein said second user's emotion data is generated according to measurable physiological parameters reflecting said second user's emotions generated during access by said second user to said at least a second electronic data content and added to said at least a second electronic data content as said at least a second tag;

in response to finding said at least a second tag, instructions for determining whether said first user's emotion data, generated by said first user is similar, based upon a predetermined strategy, to said second user's emotion data; and in response to a determination that said first user's emotion data is similar to said second user's emotion data, instructions for providing said at least a second electronic data content to said first user.

8. The system of claim 7, further comprising instructions for providing, to said first user, information related to said second user.

9. The system of claim 7, further comprising:

instructions for determining whether said first user's emotion data, generated by said first user, is dissimilar, based upon said predetermined strategy, to said second user's emotion data; and in response to a determination that said first user's emotion data is dissimilar to said second user's emotion data, instructions for providing said at least a second electronic data content to said first user.

10. The system of claim 9, further comprising instructions for providing, to said first user, information related to said second user.

11. The system of claim 7, wherein said first user's emotion data is stored and further comprising instructions for determining a most frequent emotion of said first user from said stored emotion data.

12. The system of claim 11, wherein said most frequent emotion is used to locate and present to said first user other electronic data content that will cause said first user to have said most frequent emotion.

13. A computer program product for providing electronic data content with emotion data added to the electronic data content as tags, the computer program product comprising a computer readable storage medium having computer readable program code embodied therewith, the computer readable program code comprising:

computer readable program code configured to receive a first user's emotion data generated by a first user upon accessing a first electronic data content, wherein said first user's emotion data is generated according to measurable physiological parameters reflecting said first user's emotions generated during said access by said first user;

computer readable program code configured to add said first user's emotion data to said first electronic data content as at least a first tag;

computer readable program code configured to search at least a second electronic data content, unrelated to said first electronic data content, to find at least a second tag reflecting a second user's emotion data generated by a second user upon accessing said at least a second electronic data content, wherein said second user's emotion data is generated according to measurable physiological parameters reflecting said second user's emotions generated during access by said second user to said at least a second electronic data content and added to said at least a second electronic data content as said at least a second tag;

in response to finding said at least a second tag, computer readable program code configured to determine whether said first user's emotion data, generated by said first user is similar, based upon a predetermined strategy, to said second user's emotion data; and in response to a determination that said first user's emotion data is similar to said second user's emotion data, computer readable program code configured to provide said at least a second electronic data content to said first user.

14. The computer program product of claim 13, further comprising computer readable program code configured to provide, to said first user, information related to said second user.

15. The computer program product of claim 13, further comprising:

computer readable program code configured to determine whether said first user's emotion data, generated by said first user, is dissimilar, based upon said predetermined strategy, to said second user's emotion data; and in response to a determination that said first user's emotion data is dissimilar to said second user's emotion data, computer readable program code configured to provide said at least a second electronic data content to said first user.

16. The computer program product of claim 15, further comprising computer readable program code configured to provide, to said first user, information related to said second user.

17. The computer program product of claim 13, wherein said first user's emotion data is stored to determine a most frequent emotion of said first user.

18. The computer program product of claim 17, wherein said most frequent emotion is used to locate and present to said first user other electronic data content that will cause said first user to have said most frequent emotion.

* * * * *